United States Patent [19]

Shiba et al.

[11] Patent Number: 5,195,084
[45] Date of Patent: Mar. 16, 1993

[54] DISC CARTRIDGE

[75] Inventors: Haruo Shiba; Masaru Ikebe, both of Nagano, Japan

[73] Assignee: TDK Corporation, Tokyo, Japan

[21] Appl. No.: 700,951

[22] Filed: May 14, 1991

Related U.S. Application Data

[63] Continuation of Ser. No. 319,709, Mar. 7, 1989, abandoned.

[30] Foreign Application Priority Data

Mar. 7, 1988 [JP] Japan .................. 63-29218[U]

[51] Int. Cl.$^5$ ................................ G11B 23/02
[52] U.S. Cl. .................. 369/291; 360/133; 206/444
[58] Field of Search ......... 369/291, 292; 360/132, 360/133, 135, 99.02; 206/309, 312, 444

[56] References Cited

U.S. PATENT DOCUMENTS

| | | | |
|---|---|---|---|
| 4,589,105 | 5/1986 | Nemoto et al. | 206/444 X |
| 4,614,990 | 9/1986 | Saito | 206/312 X |
| 4,622,607 | 11/1986 | Smith, II | 360/133 X |
| 4,660,118 | 4/1987 | Faber | 360/133 |
| 4,680,662 | 7/1987 | Fukushima et al. | 360/133 |
| 4,682,322 | 7/1987 | Ohta | 206/444 X |
| 4,685,017 | 8/1987 | Swinburne et al. | 360/133 |
| 4,688,206 | 8/1987 | Nakagawa et al. | 206/444 X |
| 4,755,895 | 7/1988 | Saito | 360/133 X |
| 4,780,868 | 10/1988 | Vignal | 206/309 X |
| 4,797,770 | 1/1989 | Takahasi | 369/291 |
| 4,847,826 | 7/1989 | Sakaguchi et al. | 369/291 X |
| 4,853,925 | 8/1989 | Kaneuchi | 369/291 |
| 4,888,761 | 12/1989 | Ohta | 369/291 |
| 4,908,817 | 3/1990 | Sandell et al. | 369/291 |
| 4,935,834 | 6/1990 | Muehlhausen | 360/133 |
| 4,943,880 | 7/1990 | Muehlhausen et al. | 360/133 |
| 4,945,530 | 7/1990 | Sandell et al. | 369/291 |
| 5,034,844 | 7/1991 | Shiba et al. | 360/133 |
| 5,045,959 | 9/1991 | Ishimatsu | 360/133 |

*Primary Examiner*—Paul Ip
*Attorney, Agent, or Firm*—Oblon, Spivak, McClelland, Maier & Neustadt

[57] ABSTRACT

A disc cartridge capable of ensuring smooth sliding of a shutter on a casing while preventing the shutter from striking against or hitching on a periphery of an opening on a closed side. The disc cartridge includes a casing formed with a depression on at least a portion of a guide surface thereof positioned contiguous to an end of a sliding stroke of the shutter when the shutter is slid to close the opening and contiguous to a periphery of the opening on a closed side.

6 Claims, 6 Drawing Sheets

DISC CARTRIDGE

This application is a continuation of application Ser. No. 07/319,709, filed on May 7, 1989, now abandoned.

BACKGROUND OF THE INVENTION

1. Field of the Invention

This invention relates to a disc cartridge, and more particularly to a disc cartridge in which a disc medium such as a hard disc like an optical disc, a photomagnetic disc or a magnetic disc; a floppy disc; or the like is rotatably received.

2. Description of the Prior Art

Conventionally, a tray system or a cartridge system using a casing has been generally employed for protecting a floppy disc, a compact disc, a video disc or the like which is used for a digital-data storing unit, a video unit or the like from damage and dust to ensure its safety during its storage and operation. For this purpose, the casing is provided with a slidable shutter made of metal which is operated to close a pickup inserting hole and/or a drive shaft inserting hole of the casing in nonuse and open them in use.

Such a shutter is slidably reciprocated within a sliding area in a recess formed on a casing so that one side end of a shutter plate may be selectively moved across an opening formed at the casing for serving as a pickup inserting hole for inserting a recording and/or reproducing pickup of a disc cartridge operating unit therethrough into the cartridge, a drive shaft inserting hole, or the like, resulting in operating the opening as desired. Unfortunately, the sliding area defined in the recess is formed to be substantially planar, so that the side end of the shutter plate often strikes against or hitches on a periphery of the opening on a closed side when the shutter is operated to close the opening, because it is substantially impossible to form an edge of the shutter plate free of any bending or deformation. This leads to inconveniences such as incomplete closing of the opening with the shutter, a failure in smooth operation of the shutter, undesirable shaving of the casing by the shutter plate, and the like. Also, the shaving causes dust to be produced from the casing, resulting in deteriorating safety of a disc.

Accordingly, it would be highly desirable to develop a disc cartridge which is capable of ensuring smooth operation of a shutter without adversely affecting operation of the disc cartridge.

SUMMARY OF THE INVENTION

Generally speaking, in accordance with the present invention, a disc cartridge includes a casing having means for rotatably supporting a disc received therein, the casing having at least one surface including a recessed guide surface with an opening therethrough for providing access to the disc. A shutter is slidably mounted on the casing and movable on the guide surface from an open position in which the opening is uncovered to a closed position in which a leading edge of the shutter traverses the opening so that the opening is covered. Means are providing for ensuring smooth sliding movement of the shutter to the closed position. The ensuring means comprise a depression formed in the guide surface, the depression intersecting the opening at a side of the opening closest to the leading edge when the shutter is in the closed position. The depression extends from the opening towards the leading edge in the closed position.

In a preferred embodiment of the present invention, the means comprises a depression formed on at least a part of the portion of the guide surface of the casing.

In a preferred embodiment of the present invention, the depression is formed into a relatively elongated shape.

In a preferred embodiment, the depression has a flat bottom surface. Alternatively, the depression has an inclined bottom surface.

In a preferred embodiment of the present invention, the leading edge in the closed position abuts a side surface of the recessed guide surface and the depression extends to the side surface.

Accordingly, it is an object of the present invention to provide a disc cartridge which is capable of accomplishing smooth and positive operation of a shutter while ensuring safety of a disc.

It is another object of the present invention to provide a disc cartridge which is capable of effectively preventing a shutter from shaving a casing.

It is a further object of the present invention to provide a disc cartridge which is capable of ensuring smooth sliding of a shutter on a casing while preventing the shutter from striking against or hitching on a periphery of an opening on a closed side.

It is still another object of the present invention to provide a disc cartridge which is capable of accomplishing smooth and positive access of the disc cartridge to a disc cartridge operating apparatus.

It is yet another object of the present invention to provide a disc cartridge which is capable of ensuring a safe and stable operation of a disc.

It is still a further object of the present invention to provide a disc cartridge having good aesthetic properties and facilitating assembling.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

Figure 1:
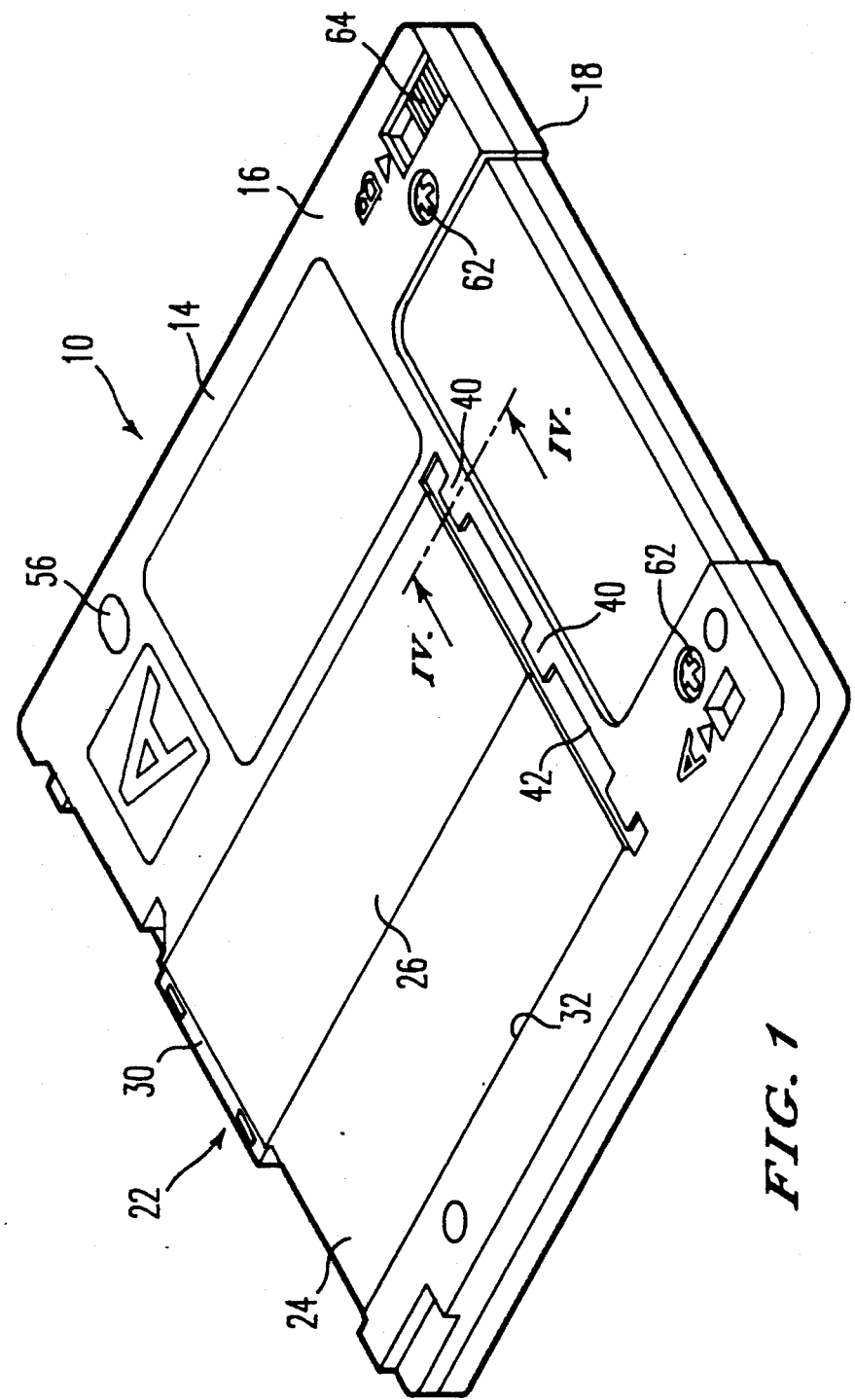
FIG. 1 is a perspective view showing an embodiment of a disc cartridge according to the present invention.
Figure 2:
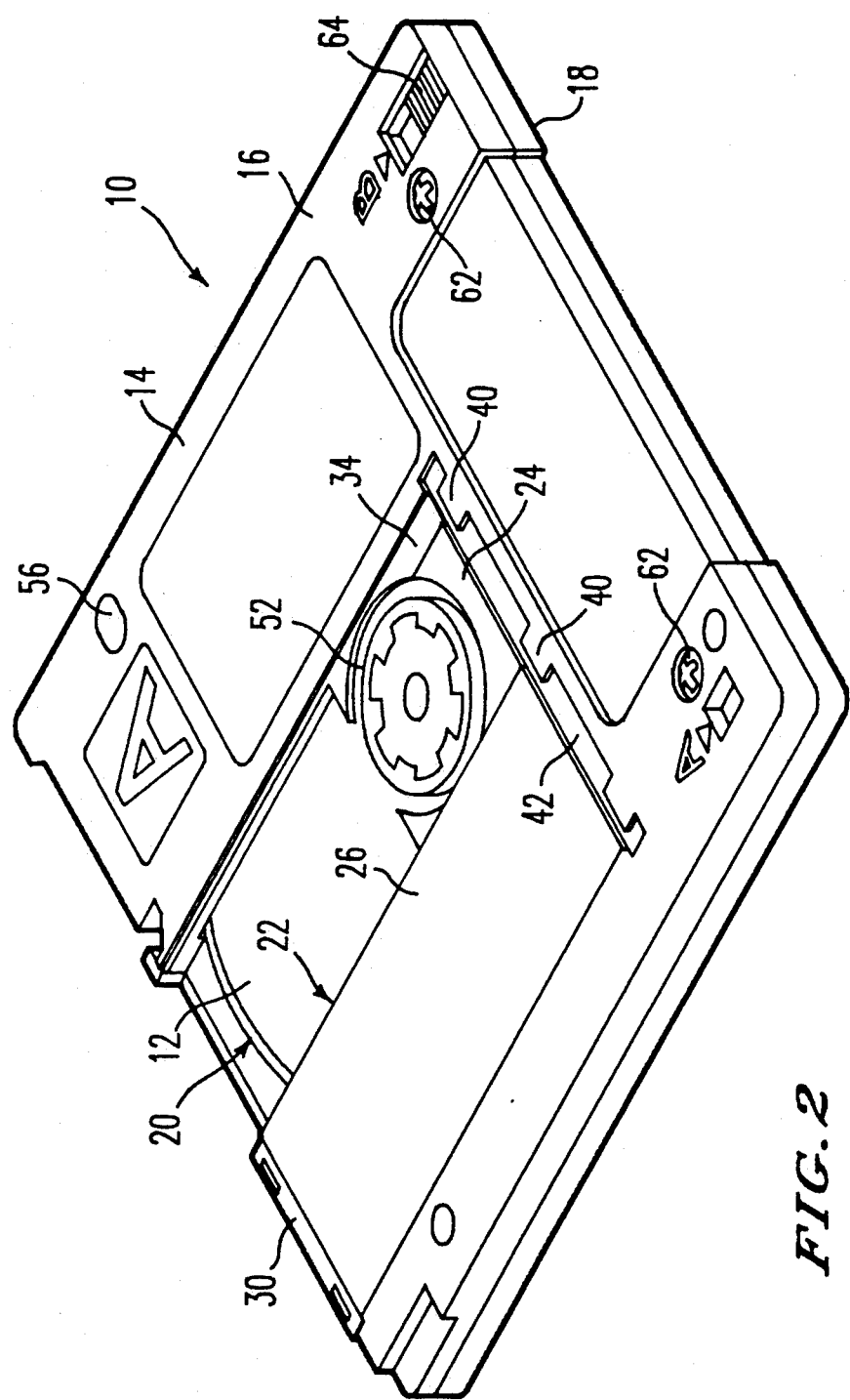
FIG. 2 is a perspective view of the disc cartridge shown in FIG. 1, in which a shutter is moved to open an opening.

Now, a disc cartridge according to the present invention will be described hereinafter with reference to the accompanying drawings.

The following description will be made in connection with an optical disc cartridge, however, the present invention is not limited to such an optical disc cartridge.

FIGS. 1 to 8 illustrate an optical disc cartridge which is an embodiment of a disc cartridge according to the present invention. An optical disc cartridge of the illustrated embodiment generally designated by reference numeral 10 includes an optical disc 12 and a casing 14 for rotatably receiving the disc 12 therein. The casing 14 is formed by joining an upper casing member 16 and a lower casing member 18 together to define a disc receiving space therein. The casing 14 is formed with at least one opening 20 serving as a pickup inserting hole for inserting a recording and/or reproducing pickup of a disc cartridge operating unit therethrough into the cartridge, a drive shaft inserting hole, or the like. In the illustrated embodiment, such opening 20 is formed at each of the lower casing members 16 and 18 so that they may be aligned with each other. However, the opening 20 may be formed at any one of the upper and lower casing members 16 and 18.

The disc cartridge also includes a shutter 22 slidably mounted or fitted on the casing 14 for operating the opening 20 while interposing upper and lower surfaces of the casing 14 therebetween. The shutter 22 is movable from the open position of FIG. 2 to the closed position of FIG. 1. In doing so, its leading edge traverses the opening 20 so that the opening is covered. For this purpose, the casing 14 is formed thereon with a guide surface 24 along which the shutter 22 is slidably moved on the casing 14. In the illustrated embodiment, the shutter 22 is formed into a substantially U-shape. More particularly, the shutter 22 includes upper and lower shutter plates 26 and 28 and a slider 30 for connecting the upper and lower shutter plates 26 and 28 to each other therethrough. Thus, the slider 30 serves as a vertical side wall of the shutter 22 as well as provides the shutter 22 with a sliding function. Correspondingly, the guide surface 24 is provided on each of upper and lower sides of the casing 14. Also, in the illustrated embodiment, the guide surface 24 comprises a bottom surface of a recess 32 formed on each of upper and lower surface thereof for slidably receiving each of the shutter plates 26 and 28 to operate the opening 20, and the opening 20 is provided at each of the guide surfaces 24 of the casing 14. The upper and lower shutter plates 26 and 28 are substantially symmetrically formed and may be made of stainless steel such as SUS 304, and the slider 30 is preferably made of a lubricous material such as polyacetal. However, when the opening 20 is provided at any one of the upper and lower casing members 16 and 18, any one of the upper and lower shutter plates 26 and 28 and any one of the upper and lower guide surfaces 24 may be eliminated correspondingly.

The disc cartridge of the illustrated embodiment also includes means for ensuring smooth sliding movement of the shutter 22 on the guide surface 24 of the casing 14 during operation of the shutter, in particular, for closing the opening 20. The means is formed by lowering at least a portion of the guide surface 24 of the casing 14 contiguous to the position of the leading edge of the shutter at an end of a sliding stroke of the shutter 22 in a direction of closing the opening 20 and intersecting a periphery of the opening 20 on a closed side. The means may be formed along at least a part of the portion of the guide surface.

The means, in the illustrated embodiment, may comprise a depression 34 formed on at least a part of a portion of the guide surface 24 of the casing 14 contiguous to one side surface 35 of the recess 32 against which the leading edge of the shutter 22 is abutted when the shutter 22 is operated to close the opening. Also, the depression 34 intersects to at least a part of a periphery of the opening 20 on a closed side.

Such construction effectively prevents the shutter plate striking against or hitching on the periphery of the opening, particularly, on the closed side to ensure smooth sliding movement of the shutter during the operation of the shutter, particularly, during the operation of closing the opening 20.

Figure 3A:
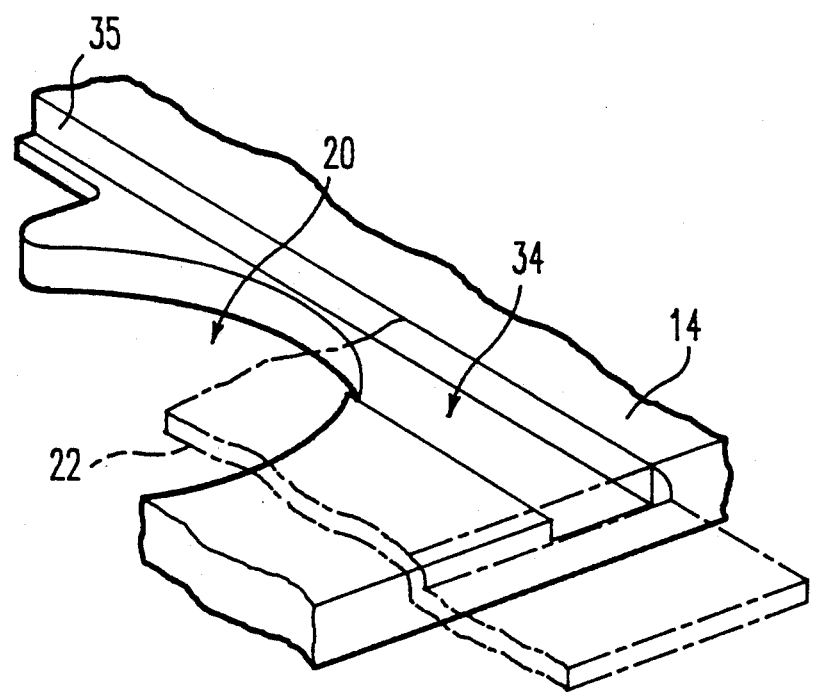
FIG. 3A is a fragmentary enlarged perspective view showing an essential part of the disc cartridge shown in FIG. 1.
Figure 3B:
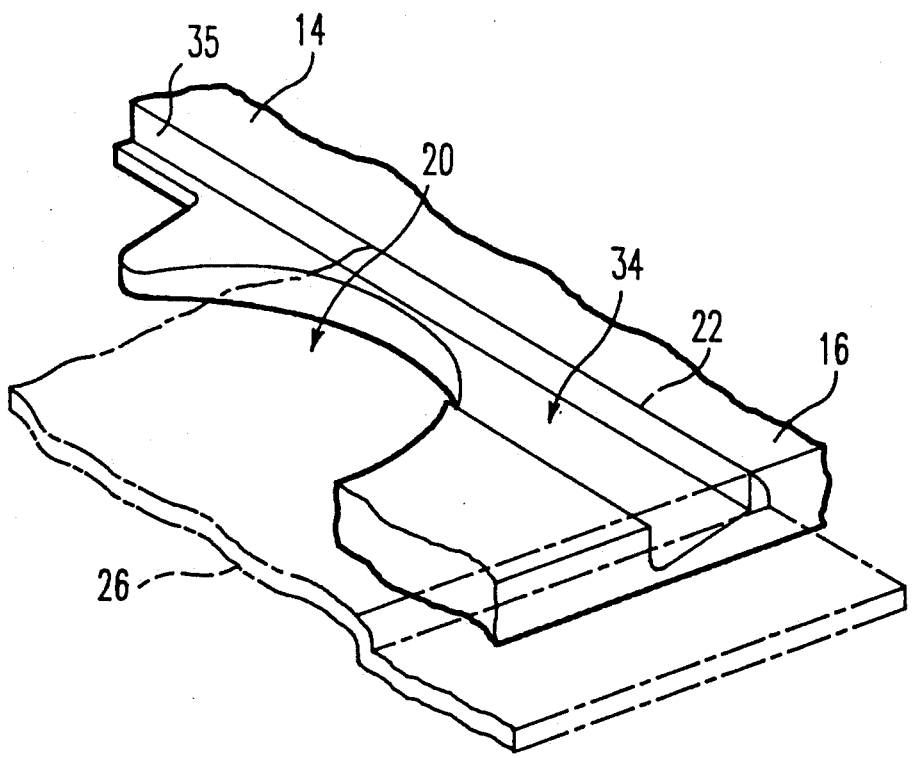
FIG. 3B is a fragmentary enlarged perspective view showing a modification of the essential part shown in FIG. 3A.
Figure 4:
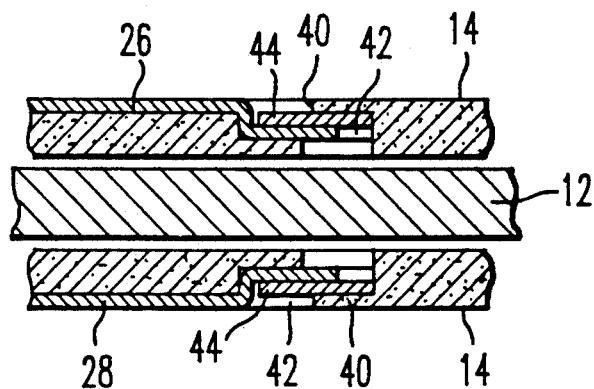
FIG. 4 is an enlarged sectional view taken along line IV—IV of FIG. 1.

In the illustrated embodiment, the depression 34, as shown in FIGS. 3A and 3B, is formed into a relatively elongated shape along at least a part of the above-described portion of the guide surface 24. The depression 34 may be formed into a rectangular shape in cross section as shown in FIG. 3A. Alternatively, a bottom surface of the depression 34 may be inclined as shown in FIG. 3B. The the other side surface of the depression 34 opposite to the side surface 12 may be inclined.

The shutter 22 is provided with a shutter assembling mechanism for accomplishing assembling of the shutter 22. In the illustrated embodiment, the shutter assembling mechanism is arranged at a joint region of the shutter 22 between each of the upper and lower shutter plates 26 and 28 and the slider 30.

Figure 8:
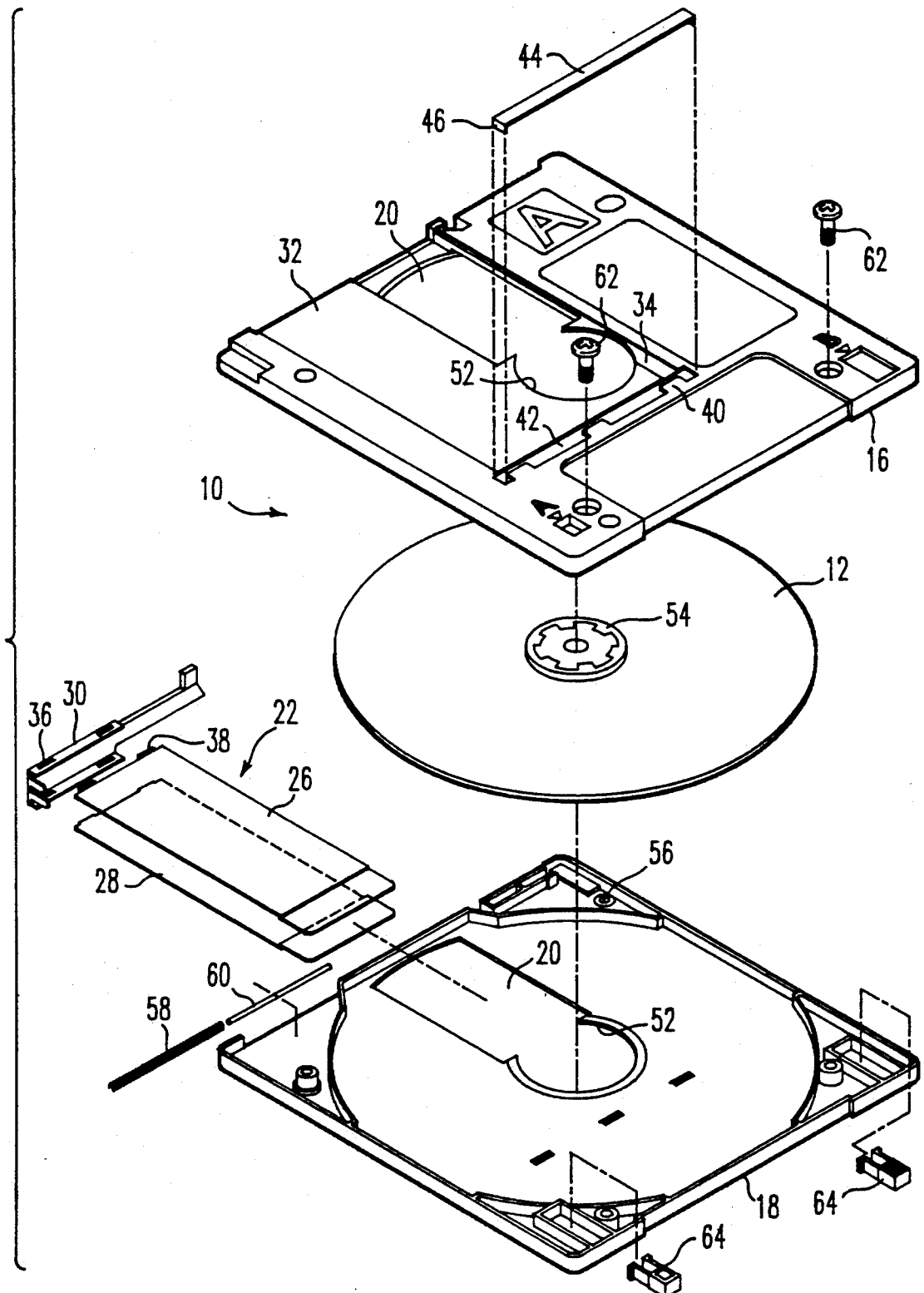
FIG. 8 is a exploded perspective view generally showing the disc cartridge shown in FIG. 1.

More particularly, as shown in FIG. 8, the shutter assembling mechanism includes at least one engagement hole 36 and at least one projection 38 which are provided opposite to each other at the joint region between the slider 30 and each of the shutter plates 26 and 28 so that they may be engaged with each other to carry out at least positioning between the shutter plate and slider for assembling of the shutter. In the illustrated embodiment, two such projection is provided on each of the shutter plate and correspondingly four such holes 36 are provided at the slider 30. Alternatively, the shutter 22 may be integrally formed by forming a metal sheet into a substantially U-shape by pressing and bending.

Figure 5:
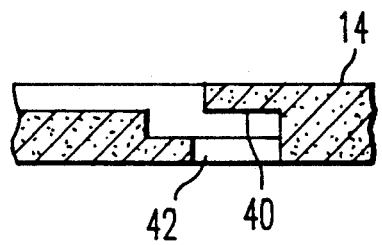
FIG. 5 is a fragmentary vertical sectional view showing a part of a casing.
Figure 6:
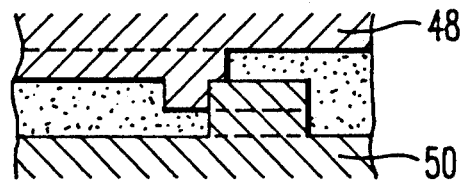
FIG. 6 is a fragmentary vertical sectional view showing a process of formation of the part of the casing shown in FIG. 5.
Figure 7:
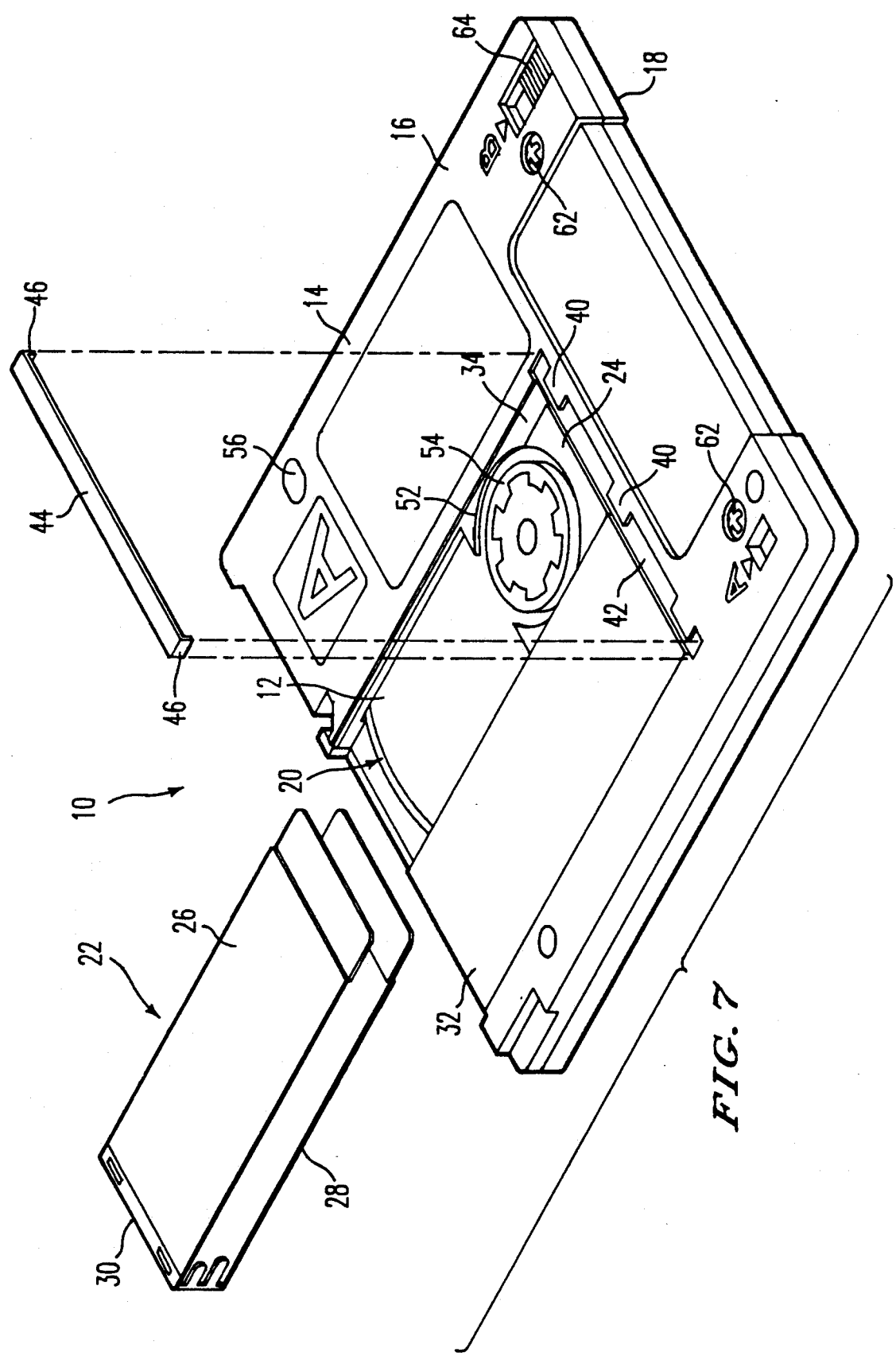
FIG. 7 is a partly exploded perspective view of the disc cartridge shown in FIG. 1.

In order to ensure safe and positive sliding movement of the shutter plates 26 and 28 and therefore the shutter 22, each of the shutter plates is inwardly bent or stepped at a distal end thereof to cause the stepped end to be fittedly inserted under tongue-like holding elements 40 provided at each of the upper and lower casing members 16 and 18 of the casing 14. Then, the distal end of each of the shutter plates is slidably fitted in a gap 42 defined under a holding plate 44 provided at both ends thereof with stoppers 46 through which the holding plate 44 is securely mounted on the casing 14. The holding elements 40 and gap 42, as shown in FIG. 5, may be concurrently formed using butt arrangement between a fixed mold 48 and a movable mold 50 as shown in FIG. 6.

Each of the openings 20 is provided with a circular portion 52, in which a hub 54 of the disc 12 is arranged. Also, each of the casing members is formed with a pin inserting hole 56.

In the disc cartridge of the illustrated embodiment constructed as described above, the opening 20 is closed with the shutter 22 in non-use. When the disc cartridge is charged in a disc cartridge operating unit, the shutter 22 is slid to open the opening 20. Reference numeral 58 (FIG. 8) designates a spring mounted on a shaft 60, which acts to constantly force the shutter in a direction of closing the opening 20. Reference numeral 62 designates mounting screws and 64 is a misoperation preventing pawl element.

As can be seen from the foregoing, in the disc cartridge of the illustrated embodiment, when the shutter 22 is forcedly moved in a direction of closing the opening 20 by the spring 58 after the disc cartridge is drawn out from a disc cartridge operating unit, the shutter 22 is smoothly slid on the guide surface 24 of the casing 14 without striking against or hitching on the periphery of the opening 20, particularly, on the closed side even when the shutter is bent or deformed, because the depression 34 is formed on the portion of the guide surface 24 of the casing which is positioned contiguous to the side surface 35 of the recess 32 against which the shutter 22 is abutted when the shutter is moved to close the opening 20 and contiguous to the periphery of the opening 20 on the closed side. This substantially eliminates or minimizes a possibility that the shutter plates scratch the casing, to thereby prevent generation of dust and ensure smooth operation of the shutter. Accordingly, it will be noted that the present invention significantly improves reliability in the operation while eliminating adverse affection on the disc.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A disc cartridge comprising:
    a casing having means for rotatably supporting a disc received therein, said casing having at least one surface including a recessed guide surface with an opening therethrough for providing access to the disc;
    a shutter slidably mounted on said casing and movable on said guide surface from an open position in which said opening is uncovered to a closed position in which a leading edge of said shutter traverses said opening so that said opening is covered; and
    means for ensuring smooth sliding movement of said shutter to said closed position, said ensuring means comprising a depression formed in said guide surface, said depression intersecting said opening at a side of said opening closet to said leading edge when said shutter is in the closed position, said depression extending from said opening towards said leading edge in the closed position.

2. A disc cartridge as defined in claim 1, wherein said leading edge in the closed position abuts a side surface of the recessed guide surface and said depression extends to said side surface.

3. A disc cartridge as defined in claim 1, wherein said casing has two guide surfaces on opposite sides thereof.

4. A disc cartridge as defined in claim 1, wherein said depression is formed into a relatively elongated shape.

5. A disc cartridge as defined in claim 1, wherein said depression has a flat bottom surface.

6. A disc cartridge as defined in claim 1, wherein said depression has an inclined bottom surface.

* * * * *